United States Patent [19]

Kobiske et al.

[11] 4,423,800

[45] Jan. 3, 1984

[54] SHOCK ABSORBER WITH IMPROVED COMPRESSION VALVE MECHANISM

[75] Inventors: Michael H. Kobiske, St. Charles, Ill.; Jerome S. Pepi, North Attleboro, Mass.

[73] Assignee: Maremont Corporation, Carol Stream, Ill.

[21] Appl. No.: 126,282

[22] Filed: Mar. 3, 1980

[51] Int. Cl.³ ............................................. F16F 9/52
[52] U.S. Cl. ...................................... 188/277; 16/51; 137/513.3; 137/543.21; 188/282; 188/316; 188/322.15; 251/337; 277/117; 277/216; 277/DIG. 6
[58] Field of Search ............... 188/277, 316, 317, 276, 188/281, 282, 320, 322.15; 267/129; 16/51, 52, 66, 84; 137/543.21, 543.19, 513.3, 843, 860; 251/337; 277/216, 188 A, 117, 96.2, DIG. 6

[56] References Cited

U.S. PATENT DOCUMENTS

| | | |
|---|---|---|
| 2,507,267 | 5/1950 | Patriquin . |
| 2,810,397 | 10/1957 | Olson et al. ...................... 251/337 X |
| 2,821,268 | 1/1958 | De Carbon ......................... 188/277 |
| 2,912,069 | 11/1959 | Dillenburger ...................... 188/322 |
| 4,099,602 | 7/1978 | Kourbetsos .................... 188/316 X |
| 4,109,767 | 8/1978 | Nandyal et al. . |

FOREIGN PATENT DOCUMENTS

| | | | |
|---|---|---|---|
| 2917318 | 11/1979 | Fed. Rep. of Germany ...... 188/276 |
| 1141049 | 1/1969 | United Kingdom .............. 277/96.2 |

OTHER PUBLICATIONS

Braun, W. *Oil-Free Reciprocating Compressors With P.T.F.E. Rings*, Engineering Digest (Great Britain) Aug. 1970, vol. 31, No. 8, pp. 45-50.

*Primary Examiner*—George E. A. Halvosa
*Attorney, Agent, or Firm*—Allegretti, Newitt, Witcoff & McAndrews, Ltd.

[57] ABSTRACT

An improved compression valve mechanism for a shock absorber comprising an upwardly facing annular valve seat on the shock absorber piston, an annular valve seat engaging member having an exterior periphery spaced closely from the interior periphery of the cylindrical shock absorber chamber providing a relatively small annular gap therebetween and a downwardly facing surface adapted to engage the upwardly facing annular valve seat, an annular seal mounted above the annular member in motion transmitting relation therewith, the seal being made of relatively rigid material and being split radially so as to be expandable radially outwardly and having an upwardly and inwardly facing generally frustoconical spring force transmitting surface and a peripheral sealing surface, and a coil spring above the seal having its upper end fixed with respect to the piston and having its lower end disposed in force transmitting relation with the force transmitting frustoconical surface of the seal so that the seal is biased thereby (1) downwardly against the annular member to urge the same into engagement with the piston valve seat and (2) radially outwardly to urge the peripheral sealing surface thereof into sealing engagement with the interior periphery of the cylindrical chamber. The seal when in spring biased relation has a bleed gap at the radial split thereof providing a bleed path in series with the annular gap for the flow of hydraulic fluid between the compression and rebound spaces within the cylindrical chamber.

9 Claims, 4 Drawing Figures

SHOCK ABSORBER WITH IMPROVED COMPRESSION VALVE MECHANISM

The present invention relates to hydraulic shock absorbers of the direct double acting tubular type, and more particularly to an improved piston compression valve assembly for this type of shock absorber.

Direct double acting tubular shock absorbers utilized on automotive vehicles having spring-suspended frames usually comprise a cylinder attached to the axle of the vehicle and a piston in the cylinder which is connected to the frame so that when the wheels of a relatively fast moving vehicle pass over an uneven surface the piston and cylinder move relative to one another. The cylinder contains a suitable damping liquid or hydraulic fluid which is moved from one end of the cylinder by the piston when the axle and frame move toward one another, relatively. This action is referred to as the compression stroke of the shock absorber. Most shock absorbers provide for the control of fluid from the compression space within the aforesaid one end of the cylinder across the piston to the rebound or recoil space within the other end of the cylinder. When the cylinder and piston move in the opposite direction, after compression, that is on recoil, it is desirable to provide a restricted flow path commonly referred to as a bleed orifice which will enable the oil to re-enter the compression space from the rebound space during slow speed extension type excursions of the piston within the cylinder.

An example of the valving provided in the piston for controlling the flow across the piston between the compression and rebound spaces is illustrated in Patriquin U.S. Pat. No. 2,507,267 dated May 9, 1950. In this patent the aforesaid bleed orifice is provided with a downwardly facing annular seat in the central portion of the piston having an opening extending upwardly therefrom. The seat is closed by a valve in such a way that the bleed orifice communicates between the compression space and rebound space when the recoil valve member is on the seat. Compression control is provided by channeling the flow along the slotted periphery of the piston and providing a spring pressed compression valve assembly which includes an elastomeric O-ring having its exterior periphery engaging the interior periphery of the cylinder so as to prevent flow thereby in either direction. A protector ring serves to prevent extrusion of the O-ring into the piston slots and is adapted to engage an upwardly facing valve seat on the piston. The upper surface of the elastomeric O-ring engages the radially extending flange of a carrier member of L-shaped cross-sectional configuration, the cylindrical leg portion of which also engages the upwardly facing valve seat and has one or more gaps formed therein.

During a compressive movement of the piston, hydraulic fluid in the compression space is pressurized initially causing the protector ring to move upwardly and slightly compress the elastomeric O-ring allowing fluid to pass radially inwardly between the lower surface of the protector ring and the upwardly facing valve seat of the piston and then through the gaps in the carrier ring into the rebound space. As the pressure increases, the main spring holding the carrier against the seat yields permitting the carrier to move away from the seat and a greater amount of flow thereby.

The bleed orifice in the rebound or recoil valve seat provides bleed communication between the rebound and compression spaces which is operable primarily in the recoil direction but is likewise operable in the compression direction. On rebound as the pressure of the hydraulic fluid in the rebound space increases, the rebound valve member is displaced downwardly from its seat permitting a greater amount of flow from the rebound space to the compression space than is provided by the bleed orifice.

A direct acting shock absorber can be of either the single tube or twin tube type. A single tube type provides for the accommodation of the piston rod displacement within the cylinder usually in the lower part of the compression space. A twin tube shock accommodates the piston rod displacement by an annular reservoir chamber provided between the inner tube or cylinder and the outer tube or intermediate cylinder surrounding the same. In the twin tube type, valving is provided in the base of the cylinder for controlling flow between the base of the cylinder and the reservoir chamber. In the twin tube type, the base valving provides ancillary control with respect to the control of the piston valving. The present invention contemplates both single and twin tube type shock absorbers although the invention is exemplified in a twin tube shock absorber. Moreover, the twin tube shock absorber exemplified is one of the direct acting type which is adapted to be connected between the sprung and unsprung mass of the vehicle by connectors provided on the end of the piston rod and on the base valve end cap assembly. It will be understood that the present invention is also applicable to integral type direct acting shock absorbers such as those embodied in MacPherson strut assemblies or the like. The present invention is more particularly concerned with improvements in the piston compression valve assembly of the type described above. There is always a need to provide improvements which achieve advantages in terms of the production cost without a comparable reduction in the effectiveness of the shock absorber in operation.

Accordingly it is an object of the present invention to provide improvements in the piston compression valve assembly of a shock absorber of the type described which fulfill the above need. In accordance with the principles of the present invention this objective is obtained by providing a rigid split ring piston seal molded of reinforced resinous material which eliminates the need for the carrier ring and directly cooperates with the coil spring of the valve assembly. The gap provided in the split ring cooperates with the protector ring so as to perform at least a portion of the bleed function previously provided by the gap in the recoil valve seat. By providing at least a portion of the bleed function by a gap in a split ring, the bleed function is made to be temperature compensating, a desirable characteristic.

Another object of the present invention is the provision of an improved piston compression valve assembly of the type described which is simple in construction, effective in operation and economical to manufacture.

These and other objects of the present invention will become more apparent during the course of the following detailed description and appended claims.

The invention may best be understood with reference to the accompanying drawings, wherein an illustrative embodiment is shown.

Figure 1:
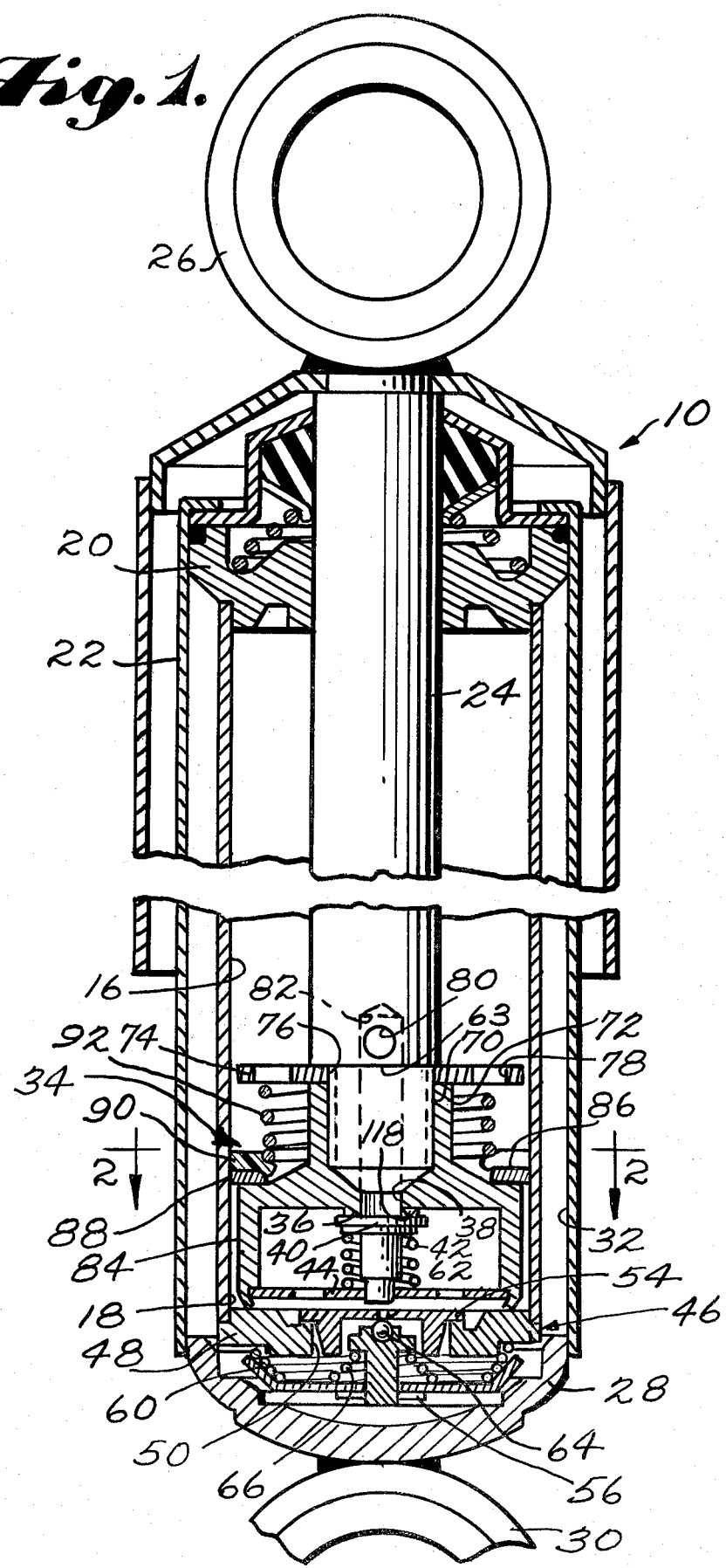
FIG. 1 is a vertical sectional view of a shock absorber embodying the principles of the present invention.

Referring now more particularly to FIG. 1 of the drawings, there is shown therein a direct acting hydraulic shock absorber, generally indicated at 10, adapted to be connected between the sprung and unsprung masses of a vehicle, which embodies the principles of the present invention.

In general, it can be stated that the unit 10 is constructed in the manner set forth in commonly-assigned U.S. Pat. No. 2,507,267, and hence the disclosure of this patent is hereby incorporated by reference into the present specification. For present purposes it is sufficient to note that the shock absorber 10 includes an inner tubular member 12, which defines a cylindrical chamber within which is slidably mounted a piston assembly 14. The piston 14 divides the cylinder into an upper rebound space 16 and a lower compression space 18. The upper end of the tubular member 12 has an end closure assembly 20 fixed thereto, which end closure assembly also receives the upper end of an outer tubular member 22.

The end closure assembly 20 serves to slidably sealingly engage the exterior periphery of a piston rod 24 which extends into the rebound space 16 and is suitably connected with the piston assembly 14. The outer end of the piston rod has an appropriate connector 26 fixed thereon which serves to connect the shock absorber 10 to the sprung mass of the vehicle. The lower end of the outer tubular member 22 has an end cap or closure 28 fixed thereto which, in turn, has a connector 30 fixed to the central exterior thereof for connecting the lower end of the shock absorber 10 with the unsprung mass of the vehicle.

It will be understood that the rebound and compression spaces 16 and 18 are filled with hydraulic fluid, which hydraulic fluid also partially fills a replenishing space 32 formed between the exterior of the inner tubular member 12 and the outer tubular member 22. In order to control the flow of hydraulic fluid from the compression space 18 into the rebound space 16 during the compression movement of the shock absorber 10, there is provided in the piston 14 an improved spring pressed piston compression valve mechanism, generally indicated at 34, embodying the principles of the present invention hereinafter to be more fully described.

The piston 14 also defines a downwardly facing annular valve seat 36 which is disposed intermediate the opposite ends of the piston in surrounding relation to a central passage 38. A rebound valve 40 is disposed in cooperating relation with the valve seat 36. As best shown in FIG. 1, the valve 40 is resiliently urged into engagement with the seat 36 by a coil spring 42, one end of which engages the valve 40 and the opposite end of which engages an insert spider 44 fixed within the adjacent end of the piston assembly 14.

In order to accommodate the piston rod displacement during the telescopic movements of the unit, there is provided a base assembly, generally indicated at 46, which is positioned adjacent the lower end closure 28.

The base assembly 46 includes a combined compression and replenishing valve which is constructed generally in accordance with the disclosure contained in U.S. Pat. No. 4,109,767, disclosure of which is hereby incorporated by reference into the present specification. For present purposes it is sufficient to note that the base assembly 46 includes a base member 48 which is fixedly connected with the lower end of the inner tubular member 12 and the interior of the end closure 28. The periphery of the base member 48 provides passages between the replenishing space 32 and the space between the base member 48 and end closure 28. Formed in the central portion of the member 48 is a central opening 50 having an upwardly facing valve seat 52 surrounding the upper end thereof. A replenishing valve member 54 is mounted within the opening 50 so that its outer marginal portion is disposed in engagement with the valve seat 52. The replenishing valve member 54 includes depending arms 56 which extend through a spring retainer 58 and are bent over to secure the spring retainer 58 for movement together with the valve member. A spring 60 is operatively arranged between the base member 48 and spring retainer 58 so as to resiliently urge the retainer 58 downwardly and hence the valve member 54 into engagement with the seat 52. Valve member 54 includes a central opening 62 which is adapted to cooperate with a ball compression valve member 64 slidably mounted within the central portion of the spring retainer 58. Valve 64 is resiliently urged upwardly by a spring 66 having its upper end engaged with the valve and its lower end seated on the spring retainer 58.

Referring now more particularly to FIG. 1, the details of construction of the improved spring pressed piston compression valve mechanism 34 embodying the principles of the present invention are shown therein. In this regard it will be noted that the piston rod 24 has its lower end formed of reduced diameter defining a downwardly facing shoulder 68. The lower extremity of the piston rod is exteriorly threaded to engage within an interior thread 70 formed on an upper portion 72 of the piston 14. The mechanism 34 includes a spring mounting disc 74 having a central opening therein adapted to engage over the exteriorly threaded lower end of the piston rod so as to be disposed in abutting engagement with shoulder 68. The threads 70 in the piston portion 72 render the piston 14 functionally equivalent to a nut operable to retain the washer 74 in engagement with the shoulder 68. Washer 74 may be provided with a series of annularly spaced oil passages 78. As best shown in FIG. 1, when the piston 14 is assembled on the piston rod 24 with the washer 74 as aforesaid, the rebound space 16 is communicated with the central opening 38 formed in the piston by a series of radially extending openings 80 in the piston rod 24 above the shoulder 68, the inner ends of which communicate with an upwardly extending bore 82 formed coaxially in the piston rod.

As best shown in FIG. 1, the piston 14 has a main body portion, the exterior periphery of which is formed with a series of annularly spaced longitudinally extending slots 84. Slots 84 provide paths for the passage of hydraulic fluid upwardly between the interior periphery of the tubular member 12 and the exterior periphery of the piston 14 which leads to an upwardly facing annular valve seat 86 surrounding the lower extremity of the upwardly projecting piston portion 72.

Figure 3:
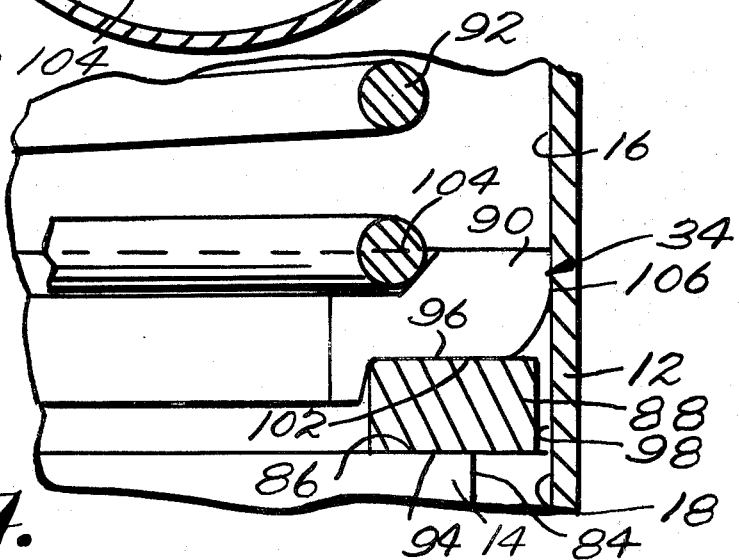
FIG. 3 is an enlarged fragmentary sectional view illustrating the position of the parts of the piston compression valve mechanism of the present invention during compressive movement.

The compression valve mechanism 34 includes three main components, namely, an annular valve seat engaging member 88, an annular seal 90 and a helical coil spring 92. As best shown in FIG. 3, the annular member 88 is preferably made of metal, as for example steel, and has a configuration which is generally similar to a washer. The annular cross-sectional configuration of the annular member 88 is essentially rectangular and provides a downwardly facing seat engaging surface 94, an upwardly facing seal engaging surface 96 and a cylindrical exterior periphery which defines with the interior periphery of the tubular member 12 an annular gap 98 of relatively small thickness, as for example, between 0.002" and 0.008".

Figure 2:
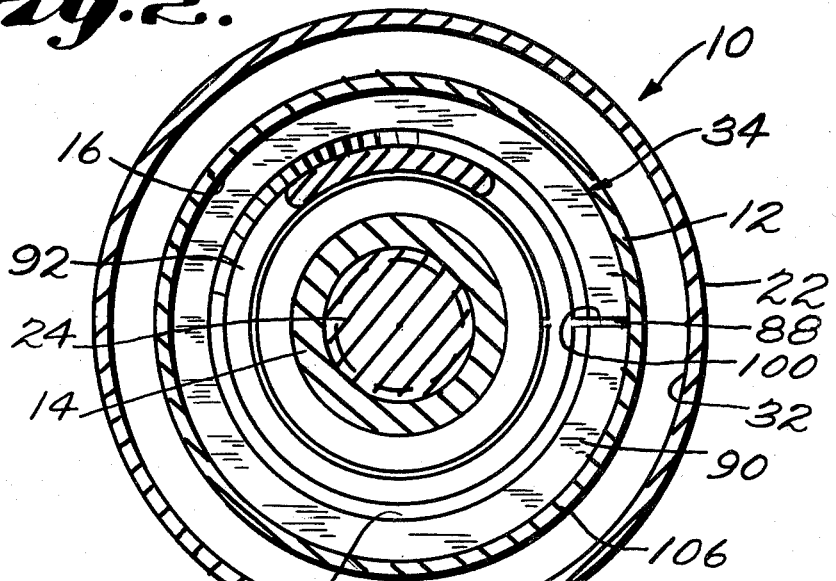
FIG. 2 is an enlarged sectional view taken along the line 2—2 of FIG. 1.

As best shown in FIGS. 2 and 3, the seal 90 is preferably molded of a reinforced resinous material. A preferred material is fiber filled nylon, as, for example, #70 G 33 HS1 made by duPont. The seal is formed with a radial split defining a radially extending gap 100 therein. The annular seal 90 includes a downwardly facing surface 102 which is adapted to engage the upwardly facing surface 96 of the valve seat engaging member 88. Formed in the upper portion of the annular seal 90 is an upwardly and inwardly facing frustoconical spring force transmitting surface 104. As shown, the frustoconical surface 104 has a slope which is approximately 45° with respect to the vertical. Seal 90 also includes an exterior peripheral sealing surface 106 which, in the as molded condition, is generally cylindrical and of a size slightly greater than the interior diameter size of the tubular member 12.

As best shown in FIGS. 2 and 3, the lower volute of the coil spring 92 is permanently deformed from a helical configuration into a circular configuration so that a substantial portion of the same as, for example, an annular extent of approximately 270° is disposed in engagement with the frustoconical surface 104 of the seal 90. The upper end of the spring 92 engages the lower surface of the washer 74.

It will be noted that the exterior periphery of the seal 90 is undercut below the cylindrical sealing surface 106 and above the annular member 88. As shown, the undercut is formed essentially by two frustoconical surfaces, one a lower frustoconical surface 108 which has a slope of approximately 45° and an intermediate frustoconical surface 110 between the lower surface 108 and sealing surface 106 which has a slope of approximately 15°. It should be noted that surfaces 108 and 110 serve a twofold purpose. First they reduce the extent of the peripheral area of the seal that is in contact with the inner cylinder surface 16 thereby providing increased contact pressure and as a consequence a better seal. Secondly the surfaces 108 and 110 constitute a lead-in portion for the seal which facilitates insertion of the piston and seal assembly into the tubular element 12 during the shock absorber assembly process.

Figure 4:
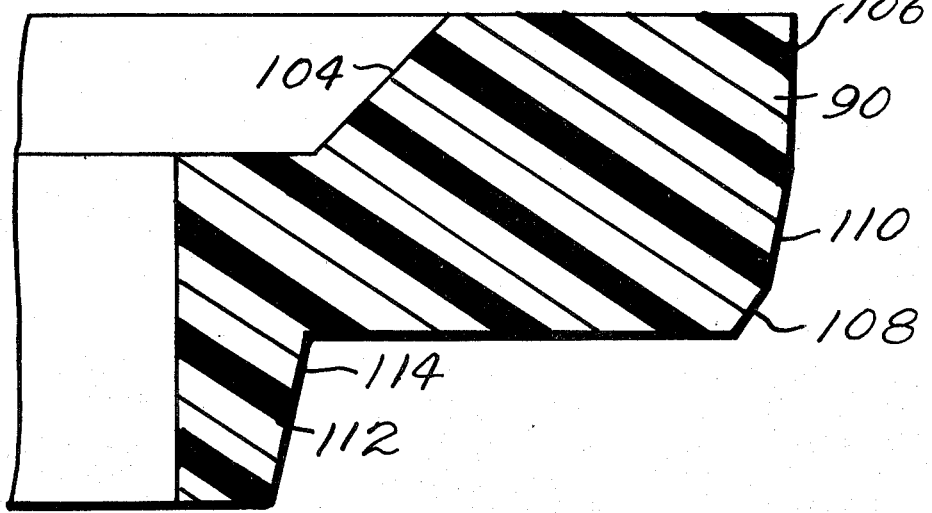
FIG. 4 is an enlarged fragmentary sectional view of the seal of the compression valve mechanism.

Finally, it will be noted that the seal includes an interior depending flange 112 which is adapted to engage within the interior of the annular member 88. As best shown in FIG. 4, the dependent flange 112 has an exterior frustoconical surface 114 which has a slope of approximately 25°.

It is important to note that the engagement of the lower circular volute of the spring 92 with the spring force transmitting frustoconical surface 104 of the seal 90 serves to resiliently bias the annular seal 90 (1) downwardly against the annular member 88 to urge the latter into engagement with the piston valve seat 86 and (2) radially outwardly to urge the peripheral sealing surface 106 into sealing engagement with the interior periphery of the tubular member 12. When the seal is in spring biased relation, gap 100 constitutes a bleed gap which provides communication with the peripheral flow channel bounded by surfaces 108, 110 of the seal, the outer peripheral portion of surface 96 of item 88 and the inner wall 16 of tubular member 12. The flow channel serves as a manifold to distribute the fluid flow to the small annular gap 98 which communicates with compression space 18. The bleed path, peripheral channel and annular gap 98 are for the flow of hydraulic fluid between the rebound space 16 and the compression space 18. This flow path is coordinated with a bleed path across the rebound valve seat 36 provided by a notch or groove 118 therein. Groove 118 corresponds to the groove 34 disclosed in the aforesaid U.S. Pat. No. 2,507,267. However, its capacity is reduced to the extent of the bleed path provided by the gaps 98 and 100. In this regard, the limiting gap of the bleed path is the gap 100 provided by the seal and this gap will become somewhat smaller in response to an increase in the temperature of the hydraulic fluid. Under normal conditions a small gap will always be provided, although where extreme temperature conditions are presented the gap may close.

The temperature compensating nature of the bleed gap 100 provided by the seal constitutes one advantage of the improved compression valve mechanism 34 of the present invention. Other advantages in comparison with the arrangement disclosed in the aforesaid patent are the elimination of the carrier element and the replacing of the elastomeric O-ring with the relatively rigid seal. The rigid seal performs the same basic function as the elastomeric ring in that it essentially eliminates uncontrolled fluid blow-by past the piston. The rigid nature of the seal and the material of which it is made give a greater useful life than the elastomeric material which must be utilized in the O-ring of the previous patent.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. In a hydraulic shock absorber adapted to be connected between the sprung and unsprung masses of a vehicle including a tubular member defining a cylindrical chamber, a piston slidably mounted within said cylindrical chamber, a piston rod extending from one side of said piston outwardly from one end of said tubular member, closure means on said one end of said tubular member closing said one end of said tubular member and slidably sealingly engaging said piston rod, end closure means on the opposite end of said tubular member, connecting means for connecting said shock absorber operatively between said masses, hydraulic fluid filling rebound and compression spaces within said cylindrical chamber on the piston rod side of said piston and on the opposite side thereof respectively, said piston having first passage means therethough, rebound valve means disposed in cooperating relation with said first passage means to control flow of fluid from said rebound space to said compression space, second passage means disposed between the outer periphery of said piston and the interior periphery of said cylindrical chamber, a compression valve mechanism carried by said piston for controlling flow of fluid through said second passage means from said compression space to said rebound space peripherally across said piston, and means to accommodate the flow of hydraulic fluid resulting from piston rod displacement, the improvement which comprises said compression valve mechanism including:

an upwardly facing annular valve seat on said piston, an annular valve seat engaging member disposed in cooperating relation with said second passage means and having an exterior periphery spaced closely apart from the interior periphery of said cylindrical chamber providing a relatively small annular gap therebetween and a downwardly facing surface adapted to engage the upwardly facing annular valve seat, an annular seal mounted above said annular engaging member in motion transmitting relation therewith, said seal being made of relatively rigid material and comprising five components:
(1) said seal being split radially to provide a bleed gap and for expanding to vary the fluid flow size of the bleed gap,
(2) said seal having an upwardly and inwardly facing generally frustoconical flat spring force transmitting surface,
(3) said seal having an outer peripheral sealing surface, and
(4) said seal having a lower seating surface;
(5) said seal having a depending interior flange extending within the interior of said annular engaging member;

a spring disposed above said seal having its upper end fixed with respect to said piston and having its lower end disposed in direct force transmitting relation with the force transmitting frustoconical surface of said seal, said spring biasing said seal for performing three simultaneous functions:
(1) downwardly urging said lower seating surface of said seal against said annular engaging member urging the same into engagement with said annular valve seat,
(2) radially outwardly urging said peripheral sealing surface of said seal into sealing engagement with the interior periphery of said cylindrical chamber, and
(3) expanding said seal to provide said bleed gap at the radial split providing a bleed path communicating with said second passage means via the annular gap of said annular engaging member, for channeling the flow of hydraulic fluid between said compression and rebound space.

2. The improvement as defined in claim 1 wherein said seal is molded of reinforced resinous material.

3. The improvement as defined in claim 2 wherein said reinforced resinous material is glass fiber filled nylon.

4. The improvement as defined in claim 1 wherein said frustoconical spring force transmitting surface has a slope of approximately 45°.

5. The improvement as defined in claim 1 wherein said seal includes an undercut portion below said peripheral sealing surface and above said annular member.

6. The improvement as defined in claim 1 wherein said spring is a helical coil spring and has a substantial portion of its lower volute permanently deformed from a helical configuration unto a circular configuration disposed in said direct contact with the spring force transmitting surface of said seal.

7. The improvement as defined in claim 6 wherein said circular spring portion extends annularly approximately 270°.

8. The improvement as defined in claim 1 wherein said depending flange includes an exterior frustoconical surface.

9. The improvement as defined in claim 1 wherein said annular seal is fabricated of thermally responsive material so that bleed function of the gap in the split ring is temperature compensating.

* * * * *